(12) United States Patent
Chiesa et al.

(10) Patent No.: US 8,776,975 B2
(45) Date of Patent: Jul. 15, 2014

(54) REDUCED STRESS PAWL AND RATCHET TOOTH FOR A ONE-WAY CLUTCH

(75) Inventors: Alfred J. Chiesa, Farmington Hills, MI (US); Henry J. Knott, Ypsilanti, MI (US)

(73) Assignee: GKN Sinter Metals, LLC, Auburn Hills, MI (US)

( * ) Notice: Subject to any disclaimer, the term of this patent is extended or adjusted under 35 U.S.C. 154(b) by 452 days.

(21) Appl. No.: 12/738,161

(22) PCT Filed: Oct. 22, 2008

(86) PCT No.: PCT/US2008/080712
§ 371 (c)(1),
(2), (4) Date: Jul. 26, 2010

(87) PCT Pub. No.: WO2009/055422
PCT Pub. Date: Apr. 30, 2009

(65) Prior Publication Data
US 2010/0288593 A1    Nov. 18, 2010

Related U.S. Application Data

(60) Provisional application No. 60/981,587, filed on Oct. 22, 2007.

(51) Int. Cl.
*F16D 41/12*    (2006.01)

(52) U.S. Cl.
USPC ..................... 192/46; 192/107 T; 192/108

(58) Field of Classification Search
USPC .......................................... 192/46; 74/577 S
See application file for complete search history.

(56) References Cited

U.S. PATENT DOCUMENTS

| 3,486,597 | A | * | 12/1969 | Carlton | 192/46 |
| 4,049,099 | A | * | 9/1977 | Zeigler | 192/46 |
| 4,788,874 | A | | 12/1988 | Nelson et al. | |
| 6,338,403 | B1 | | 1/2002 | Costin | |
| 7,451,863 | B2 | * | 11/2008 | Chen | 192/46 |
| 2004/0112703 | A1 | * | 6/2004 | Kremer | 192/46 |
| 2006/0021837 | A1 | | 2/2006 | Kimes | |
| 2006/0021840 | A1 | | 2/2006 | Kimes | |
| 2007/0131509 | A1 | | 6/2007 | Kimes | |

FOREIGN PATENT DOCUMENTS

| JP | S55-186556 | 12/1955 |
| WO | 98/57072 A1 | 12/1998 |

OTHER PUBLICATIONS

The International Search Report and Written Opinion as mailed on Apr. 27, 2009 for International Application No. PCT/US2008/080712.
European Patent Office, Supplementary European Search Report, dated Aug. 1, 2011.

(Continued)

*Primary Examiner* — Rodney Bonck
(74) *Attorney, Agent, or Firm* — Quarles & Brady LLP

(57) ABSTRACT

A one-way clutch with an outer race and an inner race is disclosed. One of the races includes at least one pawl and an engagement member for holding the at least one pawl in engagement with ratchet teeth on the other race. The contact surface of the at least one pawl or the ratchet teeth is an arcuate shape for improved load distribution. The arcuate contact surface has a radius of curvature that is greater than a radius of curvature at corners adjacent to the arcuate contact surface.

9 Claims, 3 Drawing Sheets

(56) References Cited

OTHER PUBLICATIONS

European Patent Office, Communication pursuant to Article 94(3) EPC, dated May 29, 2012.

Japanese Patent Office; Notification of Rejection Reasons for corresponding Japanese Patent Application No. 2010-531194; dated Jan. 7, 2014.

* cited by examiner

REDUCED STRESS PAWL AND RATCHET TOOTH FOR A ONE-WAY CLUTCH

CROSS-REFERENCE TO RELATED APPLICATIONS

This application claims the benefit of PCT International Application No. PCT/US2008/080712 filed on Oct. 22, 2008, which claims the benefit of U.S. Provisional Patent Application 60/981,587 filed on Oct. 22, 2007, which is hereby incorporated by reference.

STATEMENT REGARDING FEDERALLY SPONSORED RESEARCH OR DEVELOPMENT

Not applicable.

FIELD OF THE INVENTION

This invention generally relates to pawls and ratchet teeth of one-way clutches, and more particularly, the shape of the contact surfaces of the pawls and the ratchet teeth.

BACKGROUND OF THE INVENTION

One-way clutches are used in power transmission applications where torque is to be transmitted in one rotational direction, but not the opposite direction. This is achieved through the use of inner and outer races which contain the components of a ratchet mechanism. One of the races contains several pawl mechanisms which are forced into engagement with ratchet teeth on the opposite race. Both races rotate at the same speed when rotating in one direction. Freewheeling, or overrunning of the ratchet teeth, is permitted when rotating in the opposite direction, and torque is not transferred.

Referring to FIG. 1, a prior art one-way clutch includes an outer race 12 that houses a plurality of pawls 16 that engage ratchet teeth 18 of an inner race 14. The one-way clutch also includes engagement members 20 that urge the pawls 16 away from the outer race 12 and into engagement with the ratchet teeth 18. The contact surfaces 28 and 44 of the pawls 16 and the ratchet teeth 18, respectively, are flat for conventional one-way clutches. This results in a small area carrying a significant portion of the load, leading to high stress. To lower or mitigate this high stress, some designs incorporate a large number of pawls to reduce the stress on each pawl or include relatively large pawls to limit wear due to the stress. However, such designs are relatively expensive, relatively complex, or both. Therefore, a need exists for a one-way clutch design with components designed for improved load distribution.

SUMMARY OF THE INVENTION

The present invention provides a one-way clutch having an outer race and an inner race. One of the races includes at least one pawl and an engagement member for urging the at least one pawl into engagement with ratchet teeth on the other race. At least one of the ratchet teeth and the at least one pawl include an arcuate contact surface for improved load distribution. The arcuate contact surface has a radius of curvature that is greater than a radius of curvature at corners adjacent to the arcuate contact surface.

In some embodiments, the contact surface of the at least one pawl has an arcuate shape for improved load distribution. In some embodiments, the contact surfaces of the ratchet teeth have an arcuate shape for improved load distribution. Further still, in some embodiments, both the contact surfaces of the ratchet teeth and the at least one pawl have arcuate shapes.

The foregoing and other objects and advantages of the invention will appear in the detailed description which follows. In the description, reference is made to the accompanying drawings which illustrate a preferred embodiment of the invention

DETAILED DESCRIPTION OF THE PREFERRED EMBODIMENT

Figure 1:
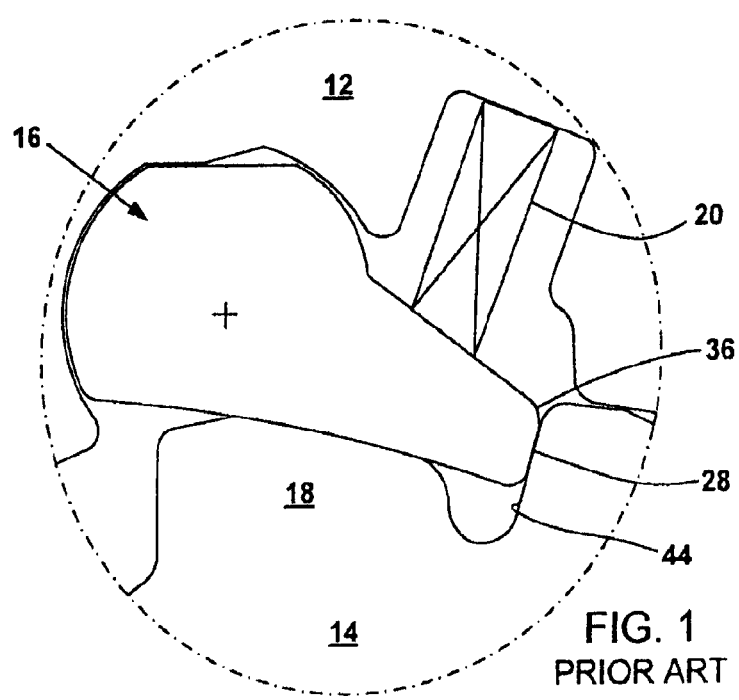
FIG. 1 is an enlarged cross-sectional view of a pawl of a prior art one-way clutch.

Referring to the figures, like components are designated with the same reference numerals. Additionally, like components between the prior-art and the present invention are increased by 100.

Figure 2:
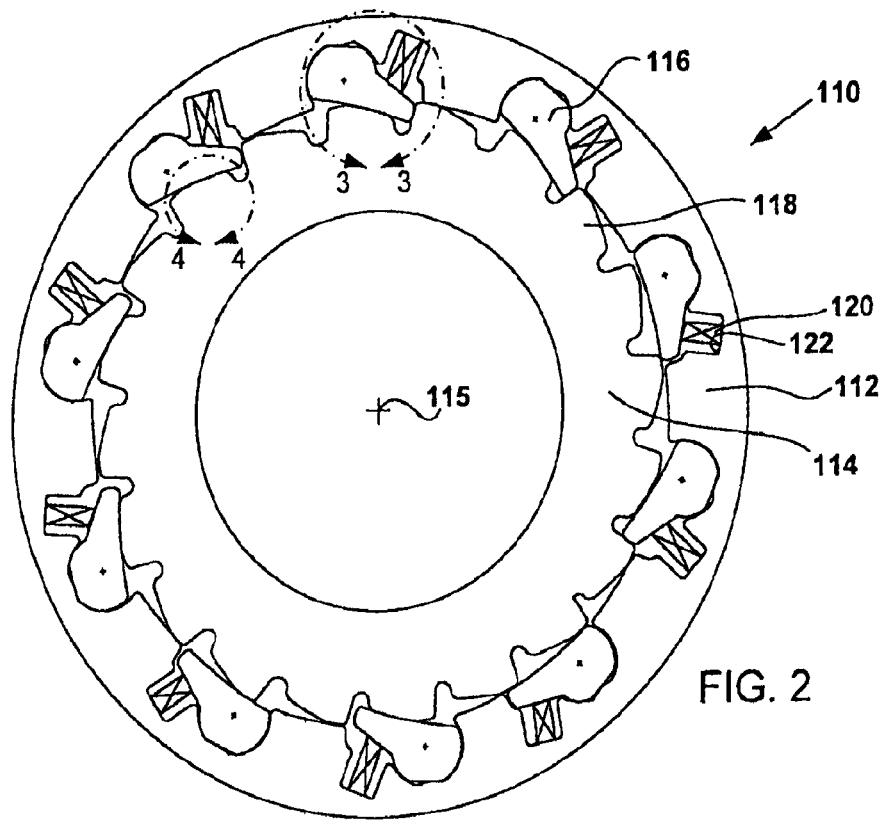
FIG. 2 is a cross-sectional view of a one-way clutch of the present invention.

Referring to FIG. 2, a one-way clutch 110 of the present invention includes an outer race 112 and an inner race 114 that have a common axis of rotation 115. The outer race 112 includes a plurality of pawls 116, engagement members 120, such as helical compression springs, Belleville springs, leaf springs, or the like, for urging the pawls 116 away from the outer race 112 and into engagement with ratchet teeth 118 on the inner race 114, and recesses or pockets 122 for accommodating the pawls 116 and the engagement members 120. If the outer race 112 is the driving component, clockwise rotation as viewed in FIG. 2 causes the engagement members 120 to bias the pawls 116 into engagement with the ratchet teeth 118. Counter-clockwise rotation of the outer race 112 causes freewheeling motion and the pawls 116 slip or ratchet over the teeth 118. If the inner race 114 is the driving component, counter-clockwise rotation causes engagement of the pawls 116 and the ratchet teeth 118 and clockwise rotation causes freewheeling motion.

Figure 3:
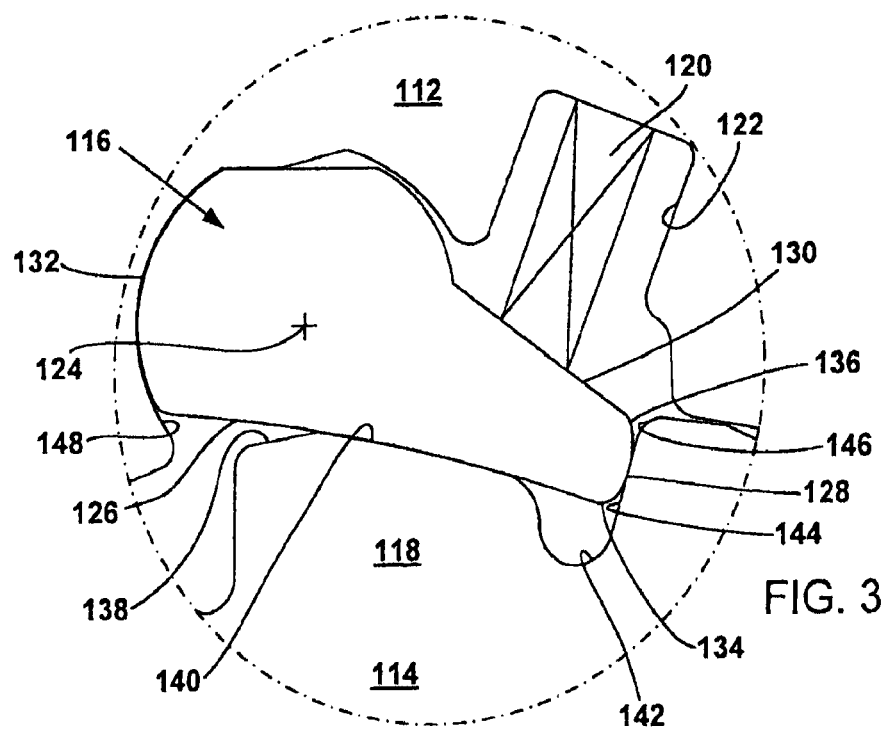
FIG. 3 is an enlarged cross-sectional view of a pawl of the present invention with an arcuate contact surface.

Referring to FIG. 3, each pawl 116 has a pawl support surface 126 and a pawl contact surface 128 that engage the ratchet teeth 118, an engagement member contact surface 130 opposite the pawl support surface 126, a pawl reaction surface 132 that defines a pivot axis 124, a radius 134 between the pawl support surface 126 and the pawl contact surface 128, and a radius 136 between the pawl contact surface 128 and the engagement member contact surface 130. Each pawl 116 pivots about the pivot axis 124 which permits the pawl 116 to rotate and slip over the ratchet teeth 118 when freewheeling, or to engage one of the ratchet teeth 118 when the clutch 110 rotates in the opposite direction.

Each ratchet tooth 118 includes a ratchet tooth free surface 138, a ratchet tooth support surface 140 and a ratchet tooth contact surface 144 that engage the pawls 116, and a radius 146 between the ratchet tooth free surface 138 and the ratchet tooth contact surface 144. The ratchet tooth support surface 140 is separated from the ratchet tooth contact surface 144 on an adjacent ratchet tooth 118 by a load separating surface 142. The load separating surface 142 extends radially inward of the ratchet tooth support surface 140.

When the pawl 116 engages the ratchet tooth 118, the pawl contact surface 128 contacts the ratchet tooth contact surface 144. These contact surfaces transmit the load between the pawl 116 and the inner race 114. The pawl support surface 126 contacts the ratchet tooth support surface 140. These contact surfaces hold the pawl 116 in a proper working position as shown in FIGS. 2 and 3. Additionally, the pawl reaction surface 132 contacts a pawl recess 148. These contact surfaces transmit the load between the outer race 112 and the pawl 116.

As briefly described above, the contact surfaces of the pawl and the ratchet tooth are both flat for conventional one-way clutches, and as a result high stress acts on these contact surfaces. Referring again to FIG. 1, a point on the pawl contact surface 28 near the radius 36 carries a significant portion of the load. Referring to FIG. 3, the pawl 116 according to the present invention includes a pawl contact surface 128 that curves as viewed in the direction of the axis of rotation 115; i.e. it curves as it traverses a generally radial direction, and as viewed in a radial plane that is perpendicular to the axis of rotation 115 of the clutch 110. Preferably, the arcuate pawl contact surface 128 has a radius of curvature that is larger than the radii of curvature of the radii 134 and 136 and is semi-circular in shape. Alternatively, the arcuate pawl contact surface 128 may be parabolic, elliptical, or the like. The arcuate pawl contact surface 128 provides a small clearance from the ratchet tooth contact surface 144 where the arcuate pawl contact surface 128 meets the radii 134 and 136. The size of the clearance depends on the dimensions of the pawl and the material used. For example, a clearance of 0.0003" is used when the height of the arcuate pawl contact surface 128 is 0.170". Additionally, the clearance where the arcuate pawl contact surface 128 meets the radius 134 could be decreased further. Additionally, the contact point 158 should be located near the midpoint of the arcuate pawl contact surface 128.

When transmitting a load, the pawl contact surface 128 deforms, and the area around the midpoint of the arcuate pawl contact surface 128 engages the ratchet tooth contact surface 144, which may be flat when unloaded, and carries a portion of the load. Contrary to conventional thinking, in accordance with the invention this results in more area of the pawl contact surface 128 being engaged with the ratchet tooth contact surface 144, and the maximum stress is significantly reduced compared to prior art clutches having both flat engagement surfaces. Therefore, it is possible to transmit the same load as a conventional one-way clutch with fewer or smaller pawls, thus saving weight and cost. Additionally, decreasing the size of the radii 134 and 136 increases the size of the pawl contact surface 128. This permits additional area of the arcuate pawl contact surface 128 to engage the ratchet tooth contact surface 144, further reducing the maximum stress and further permitting savings in weight and cost.

Figure 4:
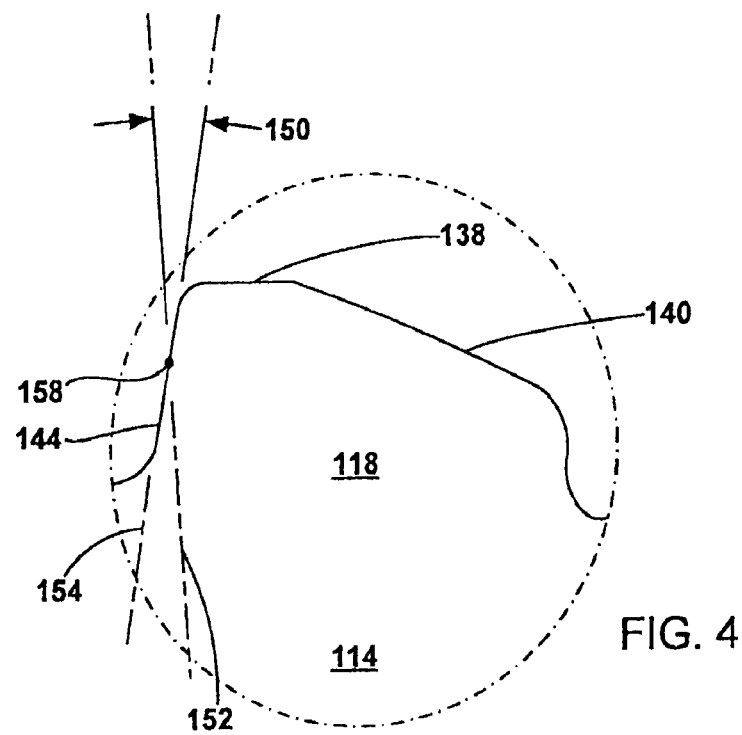
FIG. 4 is an enlarged cross-sectional view of ratchet teeth of the inner race, illustrating a rake angle.

Referring to FIG. 4, a rake angle 150 of the ratchet teeth 118 is the angle between a tangent line 154 tangent to the ratchet tooth contact surface 144 at a center of contact 158 between the pawl contact surface 128 and the ratchet tooth contact surface 144, and a radial line 152 that intersects the axis of rotation 115 and the center of contact 158. Preferably, the rake angle 150 for the present invention is 0° (±1°). Alternatively, the rake angle 150 may be increased to reduce backlash when transitioning from freewheeling motion to load transmitting motion. Also, the rake angle 150 may be decreased to reduce impact shock when freewheeling.

Figure 5:
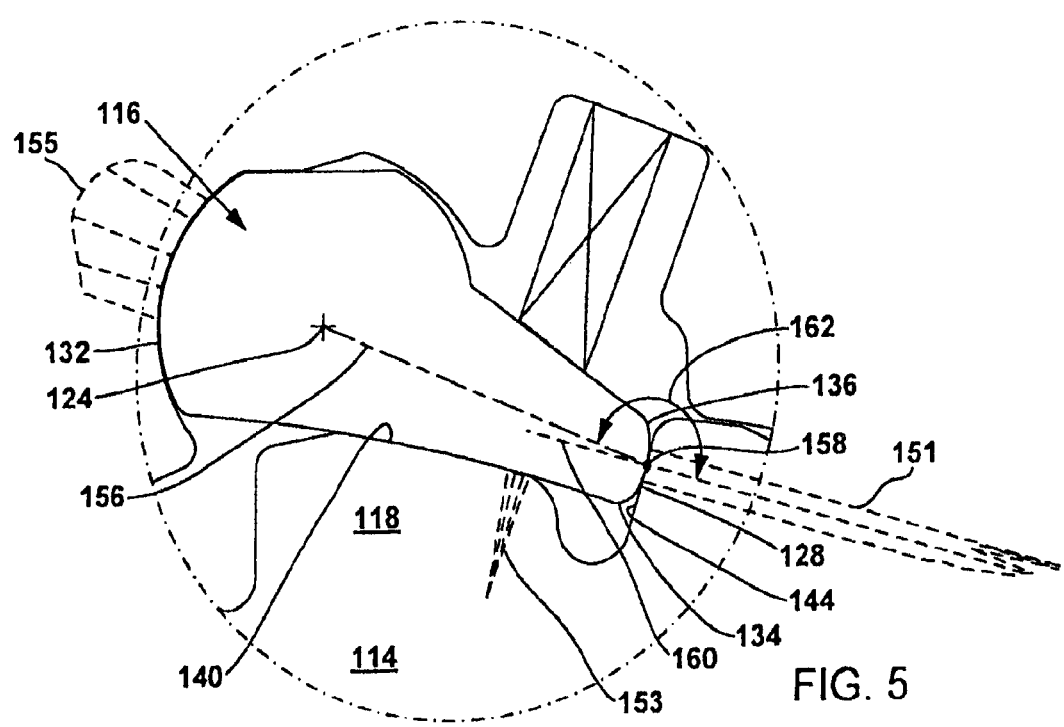
FIG. 5 is an enlarged cross-sectional view of the pawl of FIG. 3 illustrating load distributions acting on the pawl.
Figure 6:
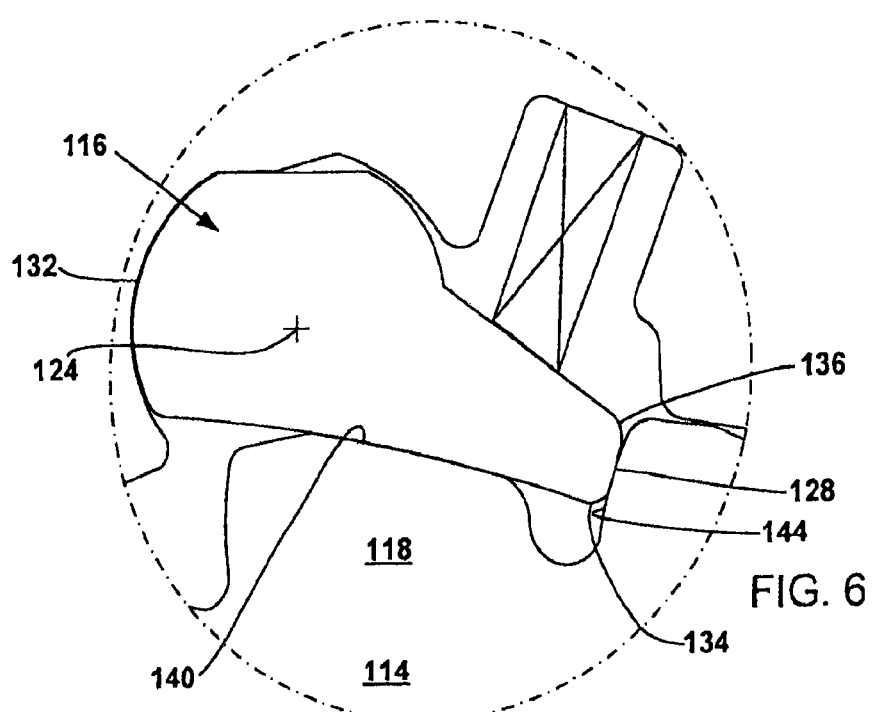
FIG. 6 is an enlarged cross-sectional view of a ratchet tooth of the present invention with an arcuate contact surface.

As discussed previously, the pawl 116 is loaded on three surfaces. As shown in FIG. 5, the pawl 116 is loaded by distributed loads 151, 153, and 155 (distributions graphically illustrated in FIG. 5) from the ratchet tooth contact surface 144, the ratchet tooth support surface 140, and the pawl reaction surface 132, respectively. The directions of the contact forces on these surfaces when the pawl 116 is loaded ensure the pawl 116 remains in engagement with the ratchet tooth 118. That is, as shown in FIG. 5, a line 156 extends through the pawl 116 between the center of contact 158 at the pawl contact surface 128 and the pivot 124, which is the center of rotation defined by the pawl reaction surface 132. The line 156 forms an angle 162 with a line of action 160 that intersects the center of contact 158 and is parallel to the direction of the net force of the distributed load 151. The net force angle 162 should be less than 180° to ensure, the pawl 116 remains in engagement with the ratchet tooth 118. If the angle is 180° or greater, the pawl 116 may remain in engagement with the ratchet tooth 118 due to friction and the spring force acting on the pawl. However, it is preferable for the pawl 116 to remain in engagement with the ratchet tooth 118 due to the contact forces on the pawl.

Alternatively, the ratchet teeth 118 may include an arcuate ratchet tooth contact surface 144 that curves in the direction from the root of the tooth to the free end of the tooth. In this case, the pawl 116 could have a pawl contact surface 128 that is flat or curved. Preferably, the arcuate ratchet tooth contact surface 144 is semi-circular. Alternatively, the arcuate ratchet tooth contact surface 144 may be parabolic, elliptical, or the like. As another alternative, the pawls 116 may be in pockets in the inner race 114 and the ratchet teeth 118 may be on the outer race 112.

The general shape of the pawls and the ratchet teeth (besides the contact surfaces) is not limited to that shown in FIG. 3. For example, rectangle-like pawls and corresponding ratchet teeth are well known in the art. Arcuate contact surfaces could also be included with these components to reduce stress.

It is specifically intended that the present invention not be limited to the embodiments and illustrations contained herein, but include modified forms of those embodiments including portions of the embodiments and combinations of elements of different embodiments as defined within the scope of the following claims.

We claim:

1. A one-way clutch comprising an outer race and an inner race having a common axis of rotation with the outer race, wherein one of the outer race and the inner race includes a plurality of ratchet teeth, each of the ratchet teeth including a ratchet tooth contact surface, the other of the outer race and the inner race includes at least one pawl recess with at least a portion of at least one pawl received in the pawl recess and an engagement member for urging the at least one pawl away from the other of the outer race and the inner race, the at least one pawl including a pawl support surface, an engagement member contact surface for engaging the engagement member, and a pawl contact surface for engaging the ratchet tooth contact surface of one of the ratchet teeth, the pawl contact surface being disposed between the pawl support surface and the engagement member contact surface, and wherein at least one of the ratchet tooth contact surface and the pawl contact surface is an arcuate surface that has a cross-sectional shape that is arcuate as viewed along the axis of rotation, the arcuate surface having a radius of curvature that is greater than a radius of curvature at corners adjacent to the arcuate surface;

wherein the arcuate surface is the ratchet tooth contact surface, and wherein the arcuate surface is a convex surface.

2. The one-way clutch of claim 1, wherein the ratchet tooth contact surface is semi-circular.

3. The one-way clutch of claim 1, wherein each of the ratchet teeth further includes a ratchet tooth support surface for engaging the pawl support surface, the at least one pawl engages the ratchet tooth contact surface of the one of the ratchet teeth and the ratchet tooth support surface of an adjacent one of the ratchet teeth, and the ratchet tooth contact surface of the one of the ratchet teeth is separated from the ratchet tooth support surface of the adjacent one of the ratchet teeth by a load separating surface.

4. The one-way clutch of claim 3, wherein the load separating surface is disposed radially inward of the ratchet tooth support surface.

5. The one-way clutch of claim 1, wherein a line extends through the at least one pawl between a center of contact at the pawl contact surface and a pivot axis of the at least one pawl, and the line forms an angle less than 180° with a line of action that intersects the center of contact of the pawl contact surface and is parallel to a direction of a net force acting on the pawl contact surface when the at least one pawl is engaged with the ratchet tooth contact surface of the one of the ratchet teeth.

6. A one-way clutch, comprising:
an inner race including a plurality of ratchet teeth, each of the ratchet teeth including a ratchet tooth support surface and a ratchet tooth contact surface;
an outer race having a common axis of rotation with the inner race, and the outer race including at least one pawl recess with at least a portion of at least one pawl received in the pawl recess and an engagement member for urging the at least one pawl away from the outer race, the at least one pawl engaging the ratchet tooth contact surface of one of the ratchet teeth and the ratchet tooth support surface of an adjacent one of the ratchet teeth, and the at least one pawl including:
a pawl support surface for engaging the ratchet tooth support surfaces;
an engagement member contact surface for engaging the engagement member; and
a pawl contact surface for engaging the ratchet tooth contact surfaces, the pawl contact surface being disposed between the pawl support surface and the engagement member contact surface;
wherein the ratchet tooth contact surface is an arcuate surface that has a cross-sectional shape that is convex and arcuate as viewed along the axis of rotation, the arcuate surface having a radius of curvature that is greater than a radius of curvature at corners adjacent to the arcuate surface.

7. The one-way clutch of claim 6, wherein the arcuate surface is the pawl contact surface, and one of the corners adjacent the pawl contact surface is disposed between the pawl support surface and the pawl contact surface, and another of the corners adjacent the pawl contact surface is disposed between the engagement member contact surface and the pawl contact surface.

8. The one-way clutch of claim 6, wherein the arcuate surface is semi-circular.

9. The one-way clutch of claim 6, wherein the ratchet tooth contact surface of the one of the ratchet teeth is separated from the ratchet tooth support surface of the adjacent one of the ratchet teeth by a load separating surface.

* * * * *